(12) United States Patent
Walmsley

(10) Patent No.: US 6,698,685 B2
(45) Date of Patent: Mar. 2, 2004

(54) CIRCULAR VERTICAL TAKE OFF AND LANDING AIRCRAFT

(76) Inventor: Eric Ronald Walmsley, 21, Howard Crescent, Seer Green, Beaconsfield Bucks HP92XR (GB)

( * ) Notice: Subject to any disclaimer, the term of this patent is extended or adjusted under 35 U.S.C. 154(b) by 152 days.

(21) Appl. No.: 10/084,749

(22) Filed: Feb. 26, 2002

(65) Prior Publication Data

US 2003/0127559 A1 Jul. 10, 2003

(51) Int. Cl.[7] ............................................... B64C 39/06
(52) U.S. Cl. ......................................................... 244/23 C
(58) Field of Search .............................. 244/12.2, 23 C, 244/73 B, 73 C, 51, 52, 55, 23 A, 23 B, 12.3

(56) References Cited

U.S. PATENT DOCUMENTS

| | | | | |
|---|---|---|---|---|
| 3,048,353 A | * | 8/1962 | Holmes | 244/23 R |
| 3,442,469 A | * | 5/1969 | Davis | 244/12.2 |
| 3,503,573 A | * | 3/1970 | Modesti | 244/12.2 |
| 3,568,955 A | * | 3/1971 | McDevitt | 244/23 D |
| 3,640,459 A | * | 2/1972 | Jaeger | 244/23 C |
| 4,312,483 A | * | 1/1982 | Bostan | 244/12.2 |
| 6,270,036 B1 | * | 8/2001 | Lowe, Jr. | 244/12.2 |

FOREIGN PATENT DOCUMENTS

| | | | | |
|---|---|---|---|---|
| CA | 750805 | * | 1/1967 | 244/12.2 |

* cited by examiner

*Primary Examiner*—Galen L. Barefoot

(57) ABSTRACT

A circular VTOL aircraft with a central vertically mounted jet or rocket engine 7, (or engines) having below vertical thrust vents 14 at cardinal points, together with a jet/rocket engine 20 (or engines) horizontally mounted on turntable pod 16 which is steerable through 360 degrees and centrally situated below the vertical engine (s). Alternatively the horizontal engine can be replaced by central thrust vent 36 delivering thrust from the vertical engine to vectored thrust nozzle 37 attached to the turntable. Thrust from the four vertical thrust vents is controlled by valves 21 giving VTOL thrust control as well as pitch and bank control. The horizontal engine provides acceleration and retro-thrust for horizontal flight and directional control through 360 degrees. The passenger cabin is situated in the main body of the aircraft. Fuel tanks are installed around the central engines. The flight-deck is situated at the top-centre of the craft above the engines, which are detachable for maintenance.

7 Claims, 6 Drawing Sheets

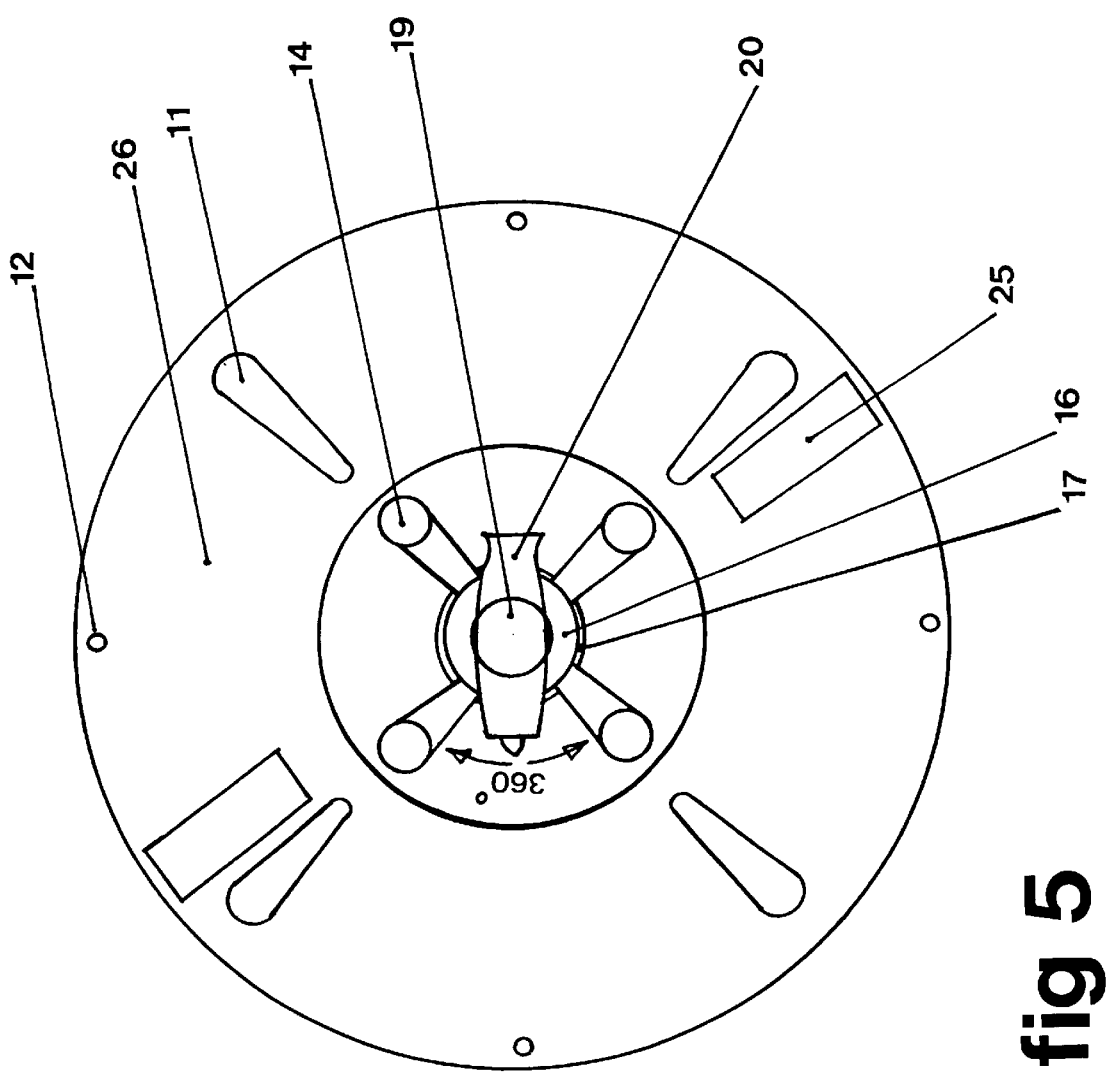

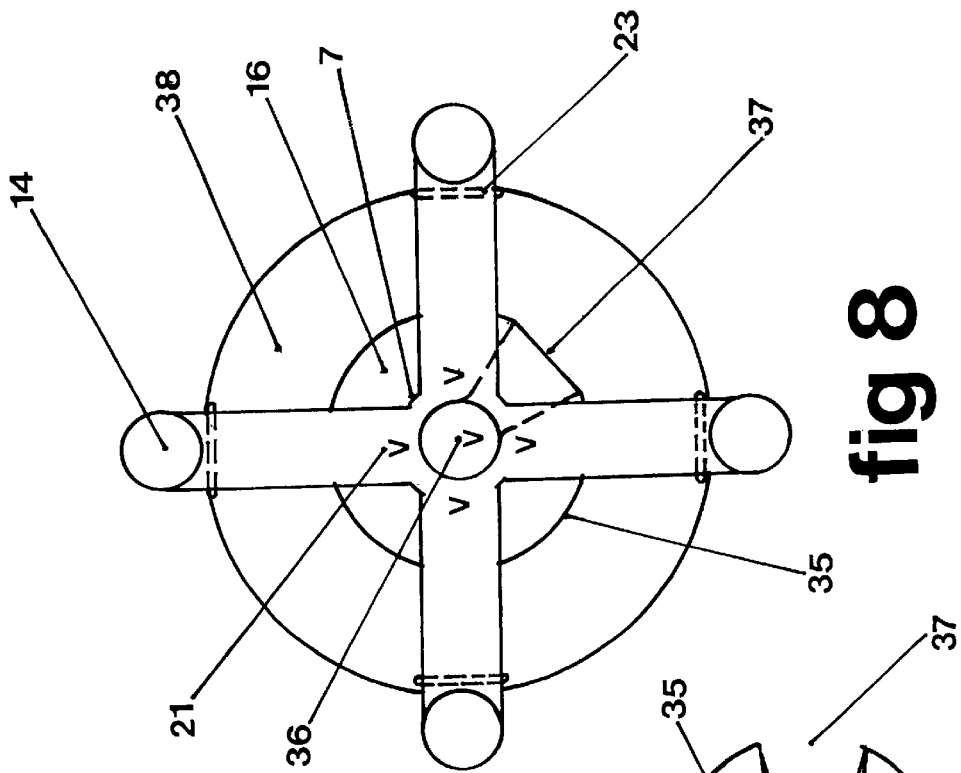
fig 8
fig 7
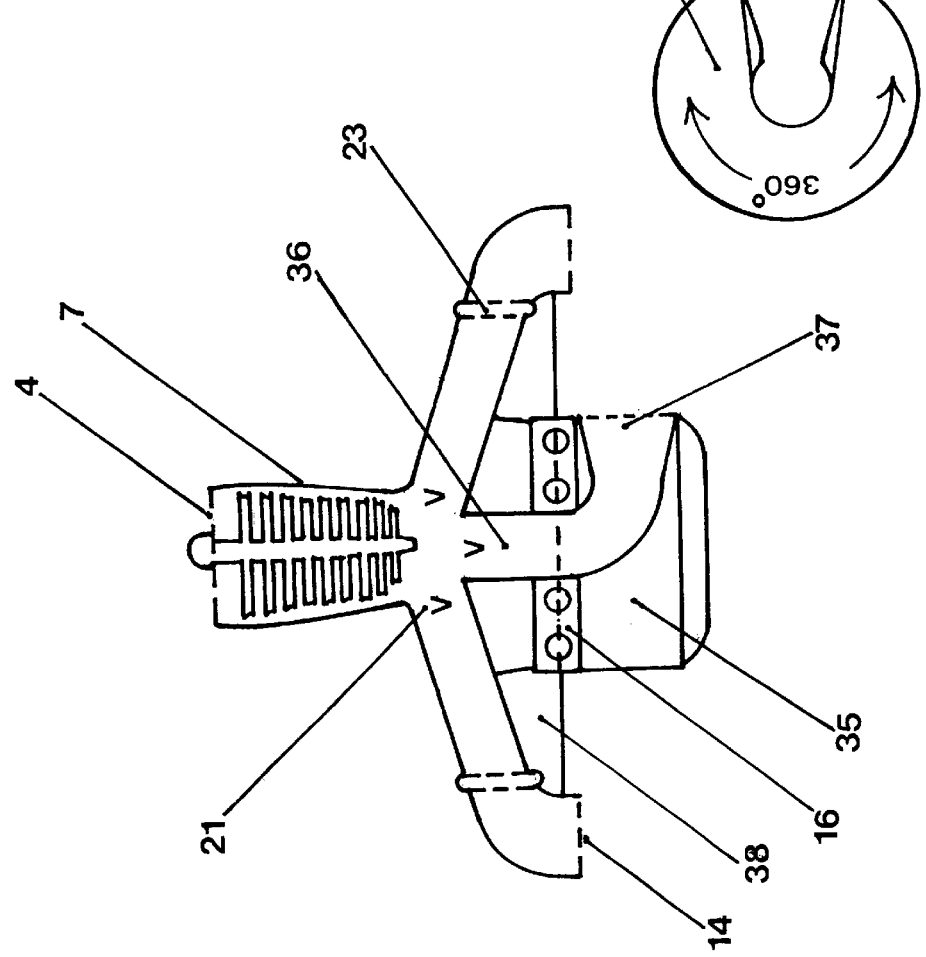
fig 6

CIRCULAR VERTICAL TAKE OFF AND LANDING AIRCRAFT

The invention comprises a circular VTOL aircraft which is capable of vertical and horizontal flight by combining propulsive power from one or more central vertically mounted jet or rocket engines delivering thrust downwards to four vertical thrust vents situated at cardinal points below the engine (or engines), together with power from a jet or rocket engine (or engines) horizontally mounted on a turntable pod which is steerable through 360 degrees and is situated centrally below the vertical thrust engine (or engines).

Alternatively the horizontal engine can be replaced by a central vent (or vents) from the vertical engine which provides vectored thrust downwards to a horizontal thrust nozzle (or nozzles) attached to the turntable and steerable through 360 degrees. (via steering control in the cockpit).

The stability of the craft in the horizontal plane is achieved by variable thrust control from the four cardinal vertical thrust vents giving pitch and bank control as well as full vertical take-off and landing thrust control. Thrust from the horizontal engine provides acceleration and braking power for horizontal flight as well as directional control through 360 degrees.

With the combined use of these power configurations the aircraft can achieve rapid flight manoeuvres in all directions, including for example rapid ascent or descent using full VTOL thrust control; rapid changes in direction in the horizontal plane from forward to reverse, or from side to side, or change of direction through 90 degrees, or through 360 degrees, together with pitch and bank control, as well as spin control.

This rapid manoeuvrability in the horizontal plane combined with a high rate of ascent or descent in the vertical plane, together with inherent stability as a weapons platform is designed to make the aircraft extremely effective for military applications such as rapid personnel deployment, air-sea rescue missions, photo-reconnaissance and fighter/bomber missions. For military operations the passenger compartment area may be re-designated both for weapons payload and for additional fuel tanks in order to extend the normal operating range. Weapons/missiles can be arranged to provide 360 degrees of effective fire cover. The aircraft may be constructed using composite GRP and carbon-fibre reinforced materials, which are both strong and light in weight, and will enable the craft to exhibit a low radar profile. An air-sea rescue version of the craft would use the vectored horizontal thrust unit (without the horizontal engine) which would allow the craft to float on the sea to rescue survivors.

The Harrier VTOL fighter aircraft has a critical high-risk transition operation from vertical to horizontal flight; this critical risk is avoided in the design disclosed because vertical thrust is constant and the transition from hover to horizontal flight is immediate on application of throttle to the horizontal engine. Designed to fly with a minimum of two engines (one for vertical, one for horizontal thrust), in the event of an engine failure the second engine can be used to effect an immediate emergency landing.

The flight-deck is situated at the top centre of the craft and is supported by structural formers above the main central engine (s). As a security feature the passenger compartment is completely separate from the flight-deck and is designed within the main body of the craft, together with cargo, and fuel tanks which are positioned around the central engine (s). The circular plan shape of the craft allows for a very large fuel capacity which will enable this design to out-range the conventional helicopter/VTOL aircraft as well as to have a higher passenger and cargo carrying capacity.

A notable feature of the design is that the passenger compartment, cargo and fuel-tank loadings are all integrated into the main body of the craft which combines the function of both wing and fuselage in one inherently strong disc-shape which generates lift in forward flight, thus avoiding existing problems such as wing flutter and spar-failure associated with high loading on conventional aircraft designs.

The aircraft can be adapted for use as a rescue vehicle to secure personnel from high-rise buildings in the event of fire, because, unlike the helicopter with its vulnerable rotor, this craft is designed to butt right up to the side of a building so that personnel trapped by fire can escape directly into the passenger compartment through hatches which slide open in the upper surface of the craft.

The aircraft can also be adapted for use as a fire-fighter, particularly against forest fires, by re-designating the passenger compartment area as a very large capacity container for liquid or foam extinguishers. (With total capacity dependent on the lifting power of the engines) The extinguishing liquids can be dumped directly onto the fire from hatches in the underside of the craft or directed onto burning buildings from pressurised nozzles around the circumference of the craft.

The VTOL performance ability would enable the aircraft to take off vertically, or at 45 degrees from the ground by using both vertical and horizontal thrust together, and then make a controlled descent at a 45 degree angle of approach to the airfield runway for landing rather than the very shallow approach path used by conventional aircraft at present: this would ensure a reduction in aircraft noise levels in residential areas close to airfields. In fog, it would be possible to position the aircraft directly overhead the airfield and complete a vertical descent onto the apron. This aircraft could also operate from much smaller airfields as it would not require the 1500 metre runway used by conventional aircraft and could also use existing helicopter landing pads on land, oil-rigs and ships.

The aircraft is designed to fly with the main disc-shaped body maintaining a level horizontal attitude through all stages of flight, thereby alleviating passenger discomfort experienced during high angle pitch and bank changes experienced in conventional aircraft. Whilst changes in direction can be made by steering the turntable of the horizontal jet, the pilot will also be able to use pitch and bank trim controls as required by varying the thrust from the four vertical thrust vents.

The aircraft conforms to the aerodynamics of the disc-shape which allows minimum air resistance or drag in horizontal flight, together with lift generated by airflow over the upper surface, and maximum air resistance in descent. Therefore, with suitable power units the craft will be capable of fast horizontal flight combined with the high drag/parachute effect of the disc diameter presented against the airflow for vertical descent and landing operations.

A specific embodiment of the invention will now be described by way of example with reference to the accompanying drawings in which:

FIG. 5 shows a plan view of the underside of the craft and illustrates the horizontal engine attached to the turntable, the four vertical thrust vents, undercarriage bays and access ladder/hatch to the passenger compartment.

FIG. 6 shows a sectional elevation of an alternative engine vent design with four vertical thrust vents and a single central vent vectored to a horizontal thrust nozzle attached to a turntable for directional control.

FIG. 7 shows a plan view of the horizontal thrust nozzle.

FIG. 8 shows a plan view of the alternative vent design described above.

Figure 1:
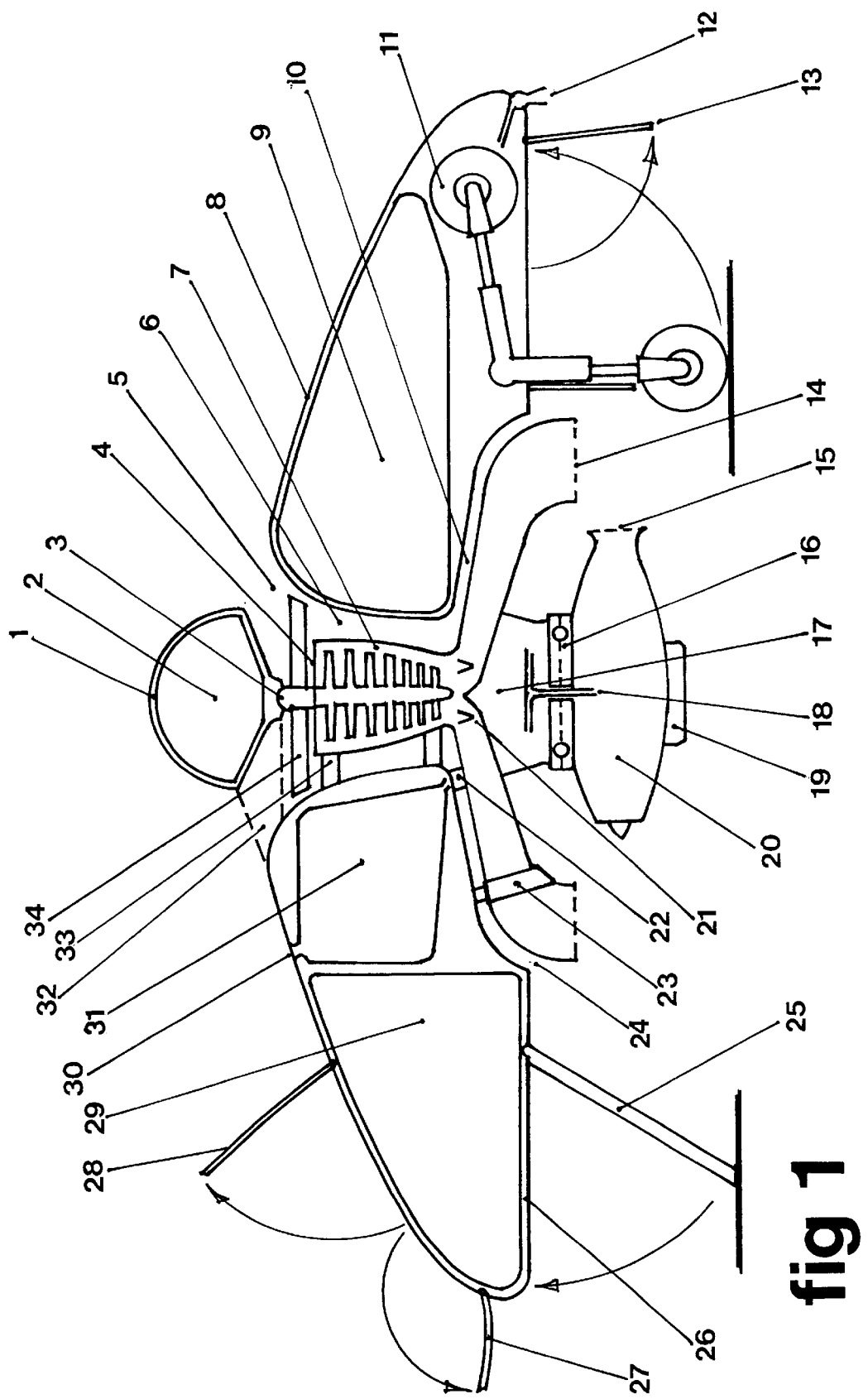
FIG. 1 shows a typical cross-sectional elevation of the craft and illustrates the vertical and horizontal propulsion systems.

N.B. Turn-table, bearings, valves, engine fan-blades and compartments shown in the drawings are representational. Single engine positions shown may be supplanted by twin engines or any multiple of engines to provide the required power to weight ratio for adaptive design versions of the craft described herein. Similarly, jet engines may be supplanted by rocket or plasma engines suitable for future performance requirements.

In FIG. 1, a jet engine 7 is mounted vertically in the centre of the aircraft by engine mounts 33, which are secured to the main bulkhead frames. Air is drawn into the engine intake 4 from the annular intake 5 positioned in the top central area of the craft. Intake covers (not shown) may be fitted within upper surface 8 to slide over air intake 5. An impeller fan 34 drives air into the by-pass chamber 6 to provide cooling air around the engine and thrust vents via annular duct 10; the air is then expelled through open vent 24 at the base of the craft. Thrust from the vertical engine is equally distributed to the four vertical thrust vents 14, which are situated at cardinal points below the engine. Valves 21, positioned at the neck of each thrust vent, (where the vent joins the engine) control the amount of thrust delivered from the engine to each vent. The valves are operated by a control column in the cockpit, whereby thrust delivered to the fore-and-aft vents will control the pitch of the aircraft, and thrust delivered to the lateral vents will control bank. It follows from this configuration that the fore-and-aft vents need to be aligned with the flight-path of the aircraft and rapid changes in direction will therefore be limited to 90, 180, and 270 degrees in either direction from the given flight path so that these pitch and bank controls remain effective. However, more gradual course changes may be made by banking the craft to left or right, then maintaining the horizontal attitude when the course change is complete. Four secondary trim controls in the form of puffer jet nozzles 12, which can be rotated to control the spin of the craft in each direction about its vertical axis, are situated at the circumference at cardinal points plus 45 degrees,(in order to offset the main thrust vents) and with jet thrust supplied from engine 7 to provide secondary pitch and bank trim control. The main vertical thrust vents 14, may be fitted with vectored thrust nozzles 23, to allow thrust to be directed through 180 degrees (i.e. 90 degrees each side of the vertical position): this would allow the pilot to rotate the lateral vents from vertical to horizontal thrust while using the fore-and-aft vents for vertical thrust and rudder control. The vectored thrust nozzles can also be rotated to spin the craft rapidly about its vertical axis.

Single vents shown in the representations may also be adapted to twin-vent or multiple vent systems relative to the twin or multiple engine types employed to provide the required thrust relating to the invention described herein.

The top fanshaft bearing 3 connects the top of the vertical engine to the upper structural framework 32. It may however be preferable to have a clearance between the engine and the said upper structural frame which supports the flight-deck 2, enclosed by hemispherical cockpit-canopy 1, positioned at the top centre of the aircraft. (In this case bearing 3 would not be required).

The horizontal thrust engine 20 is positioned centrally below vertical engine 7 and is mounted to a rotatable turntable 16 which enables the pilot to swivel the engine (via steering control) through 360 degrees, then lock the turntable to the required course. Cardinal point marks will be required on the steering control to enable the pilot to make rapid course changes through 90 degree sequences in order to align the horizontal engine with the four pitch and bank control vents as described above. Horizontal thrust is expelled at engine vent 15. The said engine is secured by a protective base-plate 19, connected to the turntable above the engine. The turntable is bolted to engine mountings 22, which are secured to the main bulkhead frames. The central engine unit may be completely disconnected from the main frame of the aircraft for maintenance.

Provision may be made for the single horizontal engine to be supplanted by twin or multiple engines connected to the central turntable in order to provide additional thrust as required by larger types of the aircraft disclosed. Provision may also be made for the said horizontal engine/s to have a vectored thrust vent fitted to give additional vertical thrust on take-off.

The main fuel tanks 31, with filler pipes 30, are situated in the main body of the craft and positioned around the central engine chamber. Fuel is pumped to the engines via structural frames 22 and 33, and the tanks are shaped to ensure gravity feed to the lower outlet; tanks may be linked together to ensure an even distribution of fuel weight around the craft as fuel is consumed. Fuel and lubricant pipes 18 (fitted with flow valves as required) which supply horizontal engine is 20, are installed to pass vertically through the centre of turntable 16 in order to allow the free movement of turntable and engine. Ancillary engine systems such as cooling plant, fuel pumps and electrical services together with turntable motor and hydraulics may be housed within the circular engine frame compartment 17. Reserve fuel tanks, cargo or supplies may be accommodated in compartments 9, above the undercarriage bays.

The retractable undercarriage units 11 have castoring main-wheels to allow free movement when taxiing and bay-doors 13, (which may be supplanted by sliding doors).

Passenger compartment 29 is situated in the main body of the craft and may have windows/port-holes (not shown) with retractable access hatch/ladders 25 fitted into the lower body 26 of the craft. In the fire-rescue version personnel enter the passenger compartment directly through the upper surface 8 of the craft, via foot-plate 27, and hatch 28, (which may also be supplanted by sliding-doors).

Figure 2:
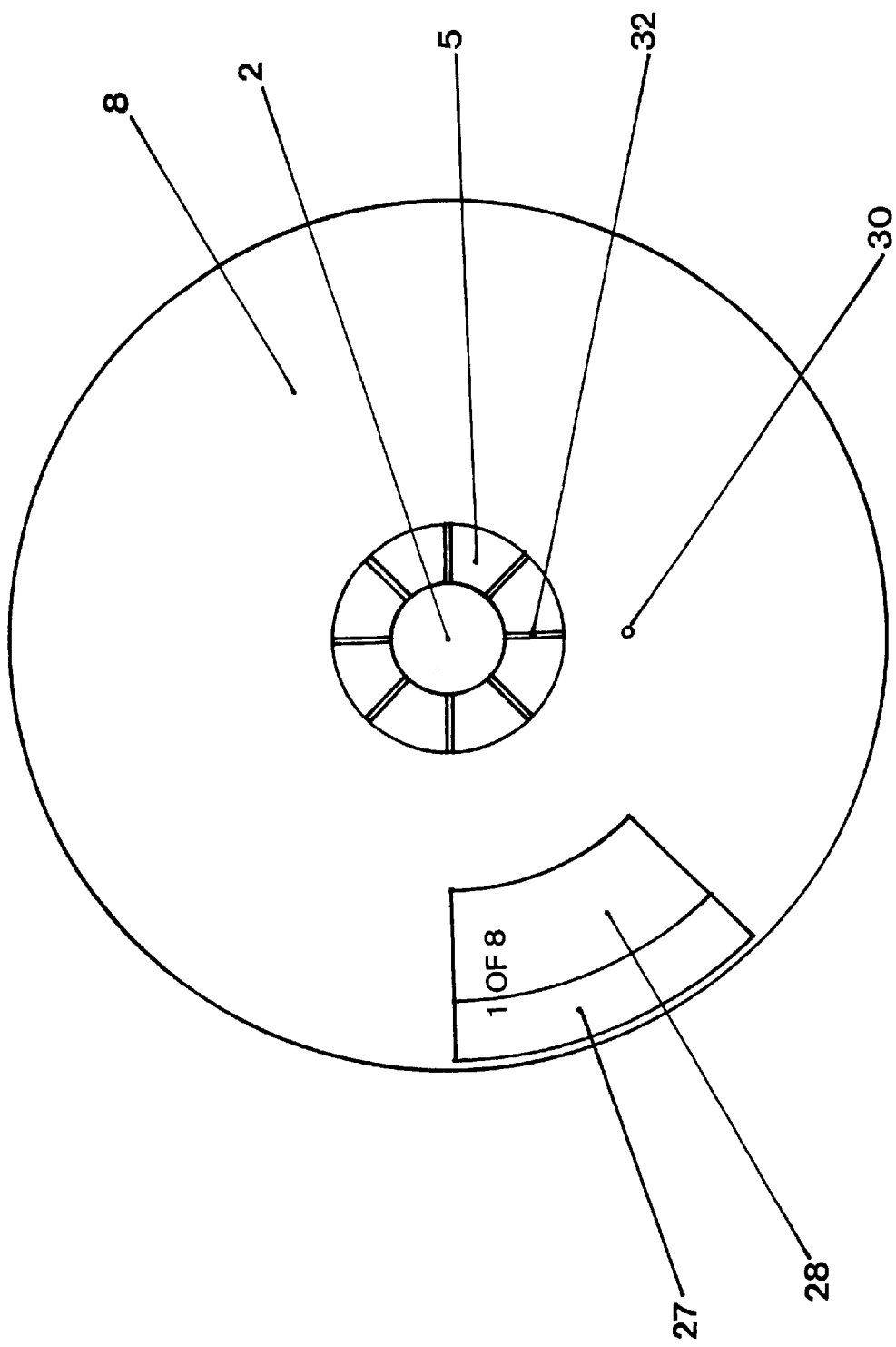
FIG. 2 shows a plan view of the top of the craft.

In FIG. 2 a plan view of the top of the aircraft shows the annular air intake 5, structural frames 32 which support the central flight-deck 2. Fuel tank filler pipe or pipes 30 are installed in the upper surface 8 of the aircraft. Personnel rescue/access hatches 27 and 28, may either hinge or slide open and will be positioned between the internal bulkhead formers (not shown)of the craft.

Figure 3:
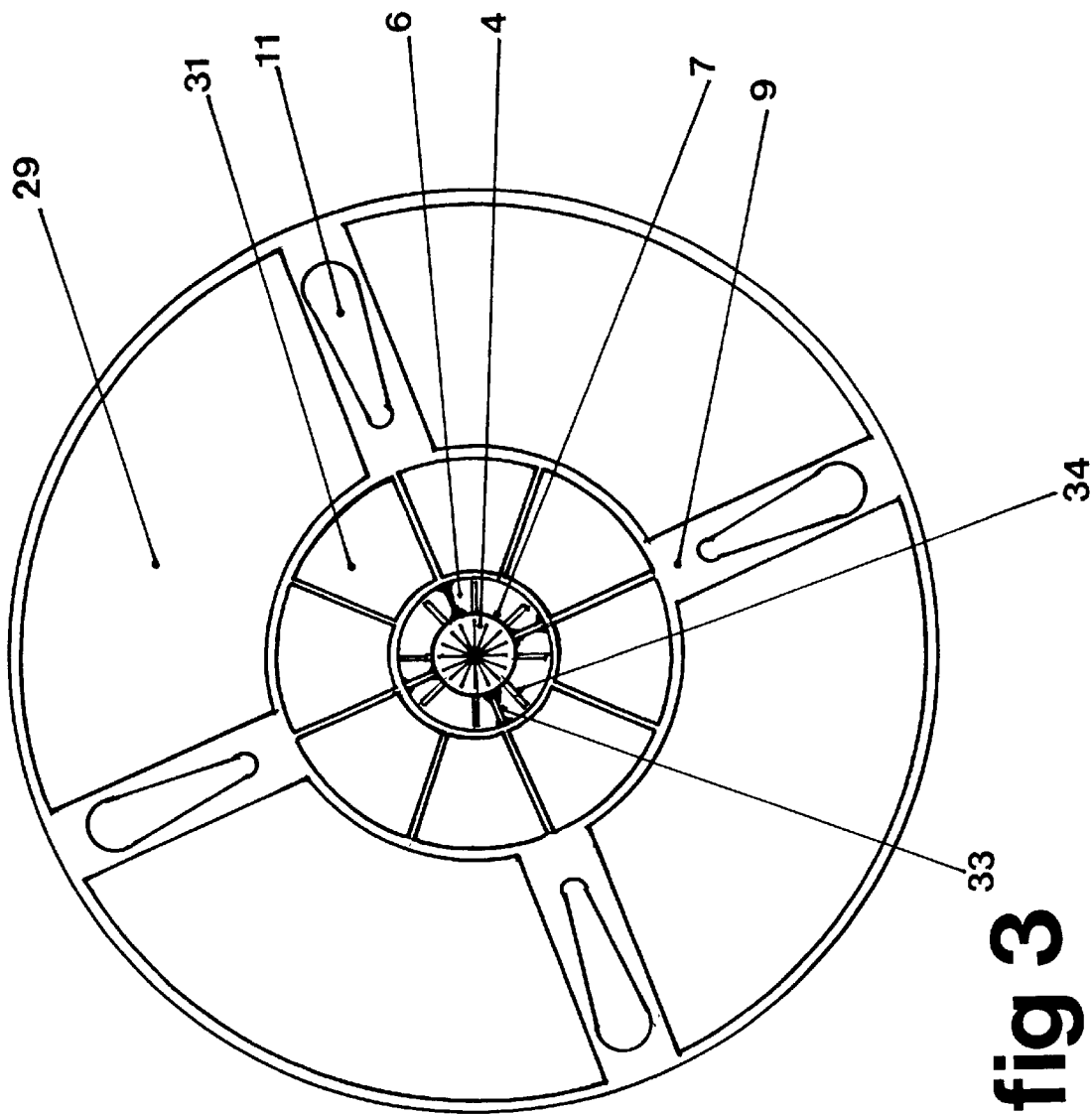
FIG. 3 shows a plan which illustrates the central vertical thrust engine, the cooling air by-pass chamber, the fuel tank layout, passenger compartment plan, and undercarriage bays.

In FIG. 3 a plan view illustrates the central vertical thrust engine 7, with intake 4, impeller-fan 34, engine mounts 33, and cooling chamber 6. Fuel tanks 31 are installed around the central engine/s. Undercarriage bays 11 are situated at cardinal points; however, provision may be made for the minimum practical number of three undercarriage bays positioned on plan at 120 degree intervals. The passenger compartments 29 are circular, extending from the circumference of the aircraft and may be linked by an access corridor as required. Compartment 9, above the undercarriage bay may be used for storage.

Figure 4:
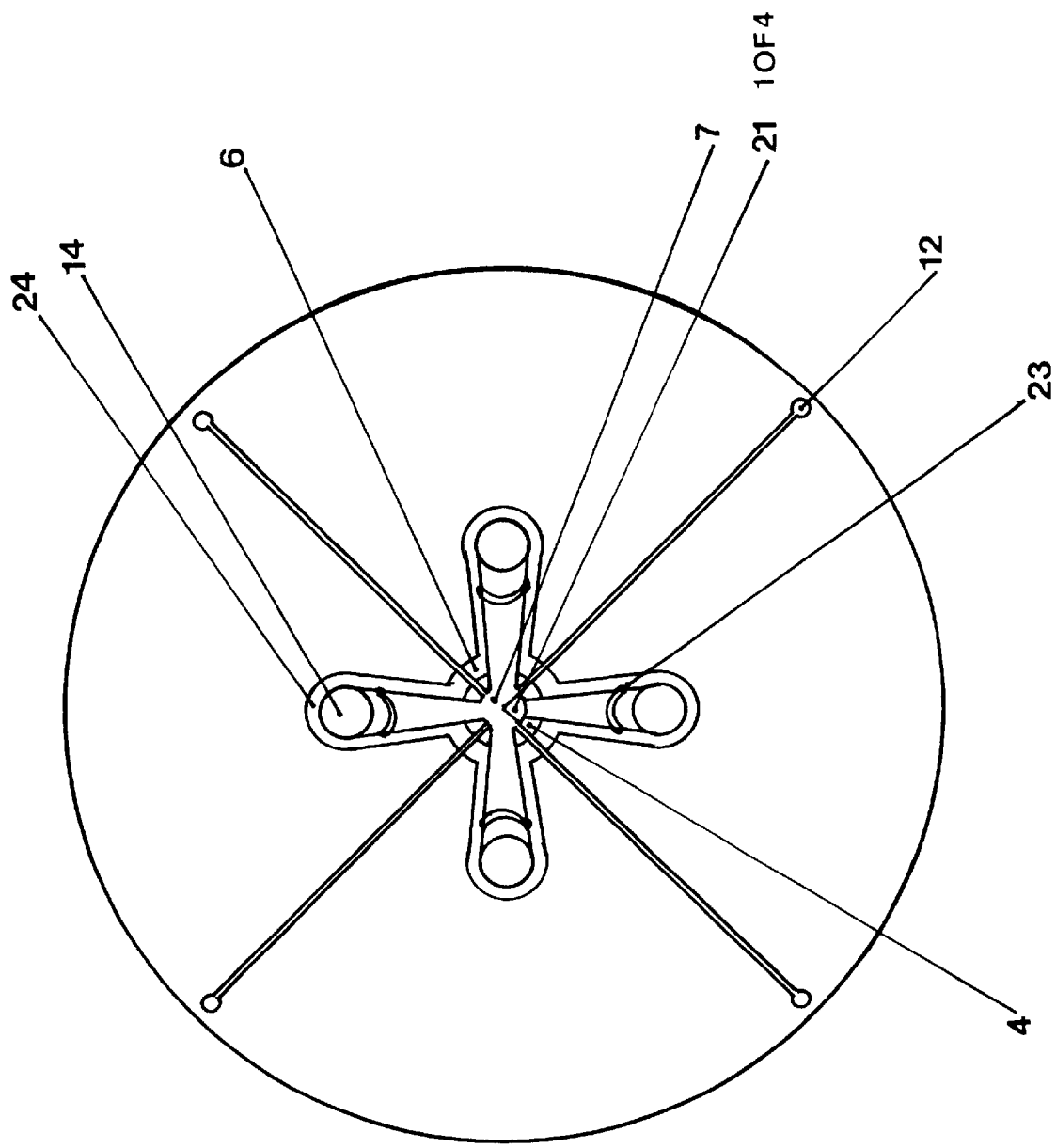
FIG. 4 shows a plan view of the thrust vents from the vertical engine and the four secondary puffer nozzles (trim/spin controls) at the circumference.

In FIG. 4, a plan view illustrates the four vertical thrust vents 14, which extend outward and downward from the base of the central vertical engine 7. Vectored thrust units 23 which swivel through 180 degrees from horizontal may be fitted to provide optional vertical thrust as well as rudder thrust control. Cooling chamber 6 surrounds the engine and has a lower exit vent 24 at the base of the craft. Four flow valves 21 control the thrust delivered from the engine to each vent. Four puffer jets 12 supplied with thrust either from the central engine or from separate compressors, are situated on the diagonal between the main thrust vents and provide additional pitch and bank trim control as well as spin control.

In FIG. 5 a plan view of the underside 26 of the craft shows horizontal thrust engine 20 with base-plate 19, attached to turntable 16 situated centrally below engine compartment 17 in relation to the vertical thrust vents 14. Typical positions for the personnel access ladder/hatch 25 are given close to the undercarriage bays 11.

FIG. 6 illustrates a sectional elevation of an alternative engine vent design where 4 main vertical thrust vents 14 extend from the base of vertical engine 7 (or engines), with the addition of a central vent 36, delivering thrust to horizontal nozzle 37. This nozzle is incorporated within vectored thrust unit 35, which is connected to turntable 16. This enables thrust from nozzle 37 to be swivelled through 360 degrees in order to steer the craft. Flow valves 21 are fitted to each vent to control thrust.

A plan of vectored thrust unit 35 with nozzle 37 is shown in FIG. 7.

FIG. 8 illustrates a plan showing the alternative engine vent design described above with the additional vent 36, vectored thrust unit 35 and nozzle 37. A circular vent cowling 38 may be fitted to stream the airflow beneath the vent system.

Whereas the essential features disclosed in the above invention relate to the juxtaposition of vertical and horizontal engines and related control vents fitted to a disc-shaped body which exhibits uniform aerodynamics in any given direction of flight, the invention also allows for the same engine configuration to be adapted for use with different types and shapes of flying wing, for example: a square, oblong or triangular shape which may have either sharp or rounded corners, and which may be aerodynamically efficient at supersonic speeds. The invention allows for the jet engine systems shown to be supplanted by rocket engines where the design disclosed may be adapted for use as a space shuttle vehicle (with passenger compartment re-designated to fuel-tank space). In this event, the advantage of using full vertical and horizontal engine thrust acting at 90 degrees to the vertical axis of the craft would allow both horizontal and vertical acceleration at the same time (to achieve a flight path of approximately 45 degrees from horizontal) until escape velocity is reached. On re-entry, full vertical thrust combined with the wide area of the disc-shape would give high air resistance or drag until the craft slows down to normal horizontal flight speed.

What is claimed is:

1. A circular Vertical Take-Off and Landing (VTOL) aircraft comprising:

an aerodynamic disc shaped airframe;

a central jet, rocket or plasma engine mounted to the airframe in a fixed vertical axis position and delivering thrust downward and outward to four vertical thrust vents which are fitted with vectored thrust nozzles to provide vertical and horizontal thrust for the aircraft and for hovering flight; said four vents being situated at cardinal points on plan, at 90 degrees to the vertical axis of the said engine;

at least one propulsion device mounted horizontally and secured to a turntable pod which can be steered through 360 degrees to enable the aircraft to move horizontally in any direction;

at least one bypass fan or impeller driven by said at least one central engine to provide airflow through a cooling chamber surrounding the said engine.

2. The circular VTOL aircraft of claim 1, wherein said at least one propulsion device which provides horizontal thrust is at least one central thrust vent from the said central vertical engine, delivering thrust vertically downward to at least one horizontal nozzle within a vectored thrust unit which is connected to said turntable that can be rotated through 360 degrees in order to steer the aircraft horizontally in any direction.

3. The circular VTOL aircraft of claim 1, wherein said at least one propulsion device is at least one of a turbojet, rocket or plasma engine.

4. The circular VTOL aircraft one of claim 1 or 2 or 3, wherein said four vertical thrust vents are angled outward far enough to clear the turning radius of the said central horizontal engine, and are fitted with vectored thrust nozzles that swivel through 180 degrees: from forward-horizontal through vertical to rearward-horizontal positions, thus providing vertical and horizontal thrust as well as yaw control; and wherein said four thrust vents are fitted with valves to control the amount of thrust delivered to said vectored thrust nozzles in order to control the pitch and bank of the aircraft in flight.

5. The circular VTOL aircraft one of claim 1 or 2 or 3, wherein the passenger compartment, as well as fuel tanks, payload and weapon-bays are incorporated in the main circular body of the aircraft, and wherein the flight-deck is situated above the said central vertical engine (or engines), and is separate from the passenger compartment.

6. The circular VTOL aircraft one of claim 1 or 2 or 3, wherein hinged or sliding doors are fitted to the upper surface of the aircraft to allow direct access to personnel during rescue operations.

7. The circular VTOL aircraft one of claim 1 or 2 or 3, wherein the passenger compartment is sized to accommodate fuel tanks; the hull structure strengthened; and said vertical and horizontal thrust engines upgraded to enable the aircraft disclosed to operate in the role of a re-usable space-shuttle vehicle.

* * * * *